(12) United States Patent
Park et al.

(10) Patent No.: US 8,422,474 B2
(45) Date of Patent: Apr. 16, 2013

(54) METHOD AND APPARATUS FOR TRANSCEIVING DATA IN A MIMO SYSTEM

(75) Inventors: Jaewoo Park, Daejeon (KR); Jong-Ee Oh, Daejeon (KR); Il-Gu Lee, Seoul (KR); Sok-Kyu Lee, Daejeon (KR); Minho Cheong, Daejeon (KR); Jeeyon Choi, Daejeon (KR); Jae-Seung Lee, Daejeon (KR); Yun-Joo Kim, Suwon-si (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/443,635

(22) Filed: Apr. 10, 2012

(65) Prior Publication Data

US 2012/0195302 A1 Aug. 2, 2012

Related U.S. Application Data

(63) Continuation of application No. PCT/KR2011/001740, filed on Mar. 11, 2011.

(30) Foreign Application Priority Data

| Mar. 11, 2010 | (KR) | 10-2010-0021576 |
| Mar. 12, 2010 | (KR) | 10-2010-0022033 |
| Jul. 1, 2010 | (KR) | 10-2010-0063638 |
| Jul. 9, 2010 | (KR) | 10-2010-0066599 |
| Jul. 12, 2010 | (KR) | 10-2010-0066851 |
| Jul. 14, 2010 | (KR) | 10-2010-0068168 |

(51) Int. Cl.
*H04W 4/00* (2009.01)

(52) U.S. Cl.
USPC .................... 370/338; 370/328; 375/338

(58) Field of Classification Search .............. None
See application file for complete search history.

(56) References Cited

U.S. PATENT DOCUMENTS

| 7,062,703 B1 | 6/2006 | Keaney et al. |
| 2005/0286446 A1 | 12/2005 | Barber |

(Continued)

FOREIGN PATENT DOCUMENTS

| KR | 10-2001-0041310 A | 5/2001 |
| KR | 10-2005-0028242 A | 3/2005 |

(Continued)

OTHER PUBLICATIONS

David Astély et al., "LTE: The Evolution of Mobile Broadband", Apr. 2009, IEEE, p. 44-51.

(Continued)

*Primary Examiner* — Robert Wilson

(57) ABSTRACT

The present invention relates to a method and apparatus for transceiving data. A method in which a transmitting terminal transmits data to a receiving terminal in a MIMO system according to one embodiment of the present invention comprises the following steps: generating a data field containing the data; generating a signal field containing information on the data field; generating a data frame containing the data field and the signal field; and transmitting the data frame to the receiving terminal. According to the present invention, an end of the frame being transmitted is accurately notified to the receiving terminal in a communication system in which the frame is transmitted using MIMO, thereby decoding the frame in a more efficient manner at the receiving terminal.

30 Claims, 24 Drawing Sheets

U.S. PATENT DOCUMENTS

| | | | |
|---|---|---|---|
| 2007/0110103 | A1 | 5/2007 | Zimmerman et al. |
| 2010/0040158 | A1 | 2/2010 | Aggarwal et al. |
| 2010/0146351 | A1 | 6/2010 | Kakani et al. |
| 2011/0116487 | A1* | 5/2011 | Grandhi .................. 370/338 |
| 2011/0116489 | A1* | 5/2011 | Grandhi .................. 370/338 |
| 2011/0170627 | A1* | 7/2011 | Kwon et al. ............... 375/295 |
| 2012/0033614 | A1* | 2/2012 | Sampath et al. ............ 370/328 |
| 2012/0195392 | A1* | 8/2012 | Kushnir et al. ............ 375/296 |

FOREIGN PATENT DOCUMENTS

| | | |
|---|---|---|
| KR | 10-2008-0044321 A | 5/2008 |
| KR | 10-2009-0084997 A | 8/2009 |
| KR | 10-2009-0090970 A | 8/2009 |
| KR | 10-2009-0119857 A | 11/2009 |
| WO | WO 2009/129367 | 10/2009 |

OTHER PUBLICATIONS

Lin X. Cai et al., "A Distributed Multi-User MIMO MAC Protocol for Wireless Local Area Networks", 2008, IEEE, pp. 1-5.

International Search Report for PCT/KR2011/001740 filed on Mar. 11, 2011.

International Search Report for PCT/KR2010/007740 filed on Nov. 4, 2010.

Dionysios Skordoulis et al., "IEEE 802.11n MAC frame aggregation mechanisms for next-generation high-throughput WLANs", IEEE Wireless Communications, Feb. 2008, pp. 40-47, vol. 15, IEEE.

Extended European Search Report for EP Application No. 10 82 8525 of Feb. 7, 2013.

Extended European Search Report for EP Application No. 11 75 3656 of Feb. 6, 2013.

Hemanth Sampath et al., "802.11ac Preamble", IEEE, Jul. 13, 2010, slides 10-15.

Wahyul Amien Syafei et al., "A Design of Next Generation Gigabit MIMO Wireless LAN System", The 12$^{th}$ International Conference on IEEE, Feb. 7, 2010, pp. 941-946, Advanced Communication Technology (ICACT).

Leonardo Lanante et al., "IEEE802.11ac Preamble with Legacy 802.11a/n Backward Compatibility", IEEE, Jul. 14, 2009, slide 11.

"Supplement to IEEE standard for information technology—Telecommunications and information exchange between systems—Local and metropolitan area networks—Specific requirements. Part 11: Wireless LAN Medium Access Control (MAC) and Physical Layer (PHY) specifications: High-speed Physical Layer in the 5 GHz Band", IEEE, Dec. 30, 1999, pp. 13-23.

Yong Liu et al., "VHT Frame Padding", IEEE, Jan. 19, 2010, slide 6.

* cited by examiner

FIG. 5

METHOD AND APPARATUS FOR TRANSCEIVING DATA IN A MIMO SYSTEM

TECHNICAL FIELD

The present invention relates to a method and apparatus for transmitting and receiving data, and more particularly, to a method and apparatus for transmitting and receiving data in a multiple input multiple output (MIMO) system.

BACKGROUND ART

A wireless local area network (WLAN) basically supports a basic service set (BSS) mode including an access point (AP) serving as a connection point of a distribution system (DS) and a plurality of stations (STAs), not APs, or an independent BSS (IBSS) mode including only stations (STAs) (hereinafter, AP and STA will be referred to as a 'terminal').

In a communication system such as a WLAN, or the like, a frame (or a data frame) and length information regarding the length of the frame are exchanged between a media access control (MAC) layer and a physical (PHY) layer. In order to inform a receiver (or a receiving end) about the end of the frame, the PHY layer of a transmitter (or a sending end) includes a header having the information regarding the length of the frame and transmits the same, or adds a delimiter including information indicating the end of the frame in the end of the frame. Accordingly, in the PHY layer of the receiver recognizes the end of the received frame by using the length information or the delimiter information having a particular format included in the received frame.

An international standard of the WLAN by IEEE 802.11 defines a data unit processed in the MAC layer, as a MAC protocol data unit (MPDU). When the MPDU is transferred from the MAC layer to the PHY layer, it is called a PHY service data unit (PSDU). The information regarding the length of the frame for recognizing the end of the frame is transferred, along with the PSDU, from the MAC layer to the PHY layer. The PHY layer of the transmitter transmits the information regarding the length of the frame together with the data to the receiver. A decoder of the PHY layer of the receiver restores the MPDU included in the PSDU by the length indicated in the length information by using the length information included in a signal symbol of a physical layer convergence protocol (PLCP) preamble of the received frame, and transfers the restored data and length information to the MAC layer.

For communication based on the standard IEEE 802.11, various methods are used for the transmitter to transfer length information to the receiver. For example, in 802.11b, a PLCP header includes time information having a size of 16 bits, and in 802.11a/g, an L-SIG field of a PLCP preamble includes length information having a size of 12 bits representing the length of a frame by byte. Also, in 802.11n, an HT-SIG field of the PLCP preamble includes length information having a size of 16 bits representing the length of an MPDU or an A-MPDU (Aggregated-MPDU) of the MAC layer by byte.

DISCLOSURE

Technical Problem

The present invention provides a method and apparatus for accurately informing a receiver about the end of a transmitted frame to thus allow the receiver to effectively restore the frame, in a communication system in which a frame is transmitted by using multiple input multiple output (MIMO).

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

Technical Solution

In an aspect, a method for transmitting data by a transmission terminal to a reception terminal in a multiple input multiple output (MIMO) system includes generating a data field including the data, generating a signal field including information regarding the data field, generating a data frame including the data field and the signal field, and transmitting the data frame to the reception terminal.

In another aspect, a method for receiving data, by a reception terminal, transmitted from a transmission terminal in a multiple input multiple output (MIMO) system includes receiving a data frame including a data field including the data and a signal field including information regarding the data field, decoding the data frame and outputting the signal field and the data field, and obtaining the data from the data field by using the signal field.

In another aspect, a transmission terminal for transmitting data to a reception terminal in a multiple input multiple output (MIMO) system includes a data field generation unit generating a data field including the data, a signal field generation unit generating a signal field including information regarding the data field, a data frame generation unit generating a data frame including the data field and the signal field, and a transmission unit transmitting the data frame to the reception terminal.

In another aspect, a reception terminal for receiving data transmitted from a transmission terminal in a multiple input multiple output (MIMO) system includes a reception unit receiving a data frame including a data field including the data and a signal field including information regarding the data field, a decoding unit decoding the data frame and outputting the signal field and the data field, and a data obtaining unit obtaining the data from the data field by using the signal field.

Advantageous Effects

According to embodiments of the present invention, in a communication system in which a frame is transmitted by using MIMO, the end of a transmitted frame is accurately informed to a receiver, so the receiver can effectively restore the frame.

DESCRIPTION OF DRAWINGS

FIG. 5 shows the configuration of a VHT-DATA field according to an embodiment of the present invention.

MODE FOR INVENTION

Figure 1:
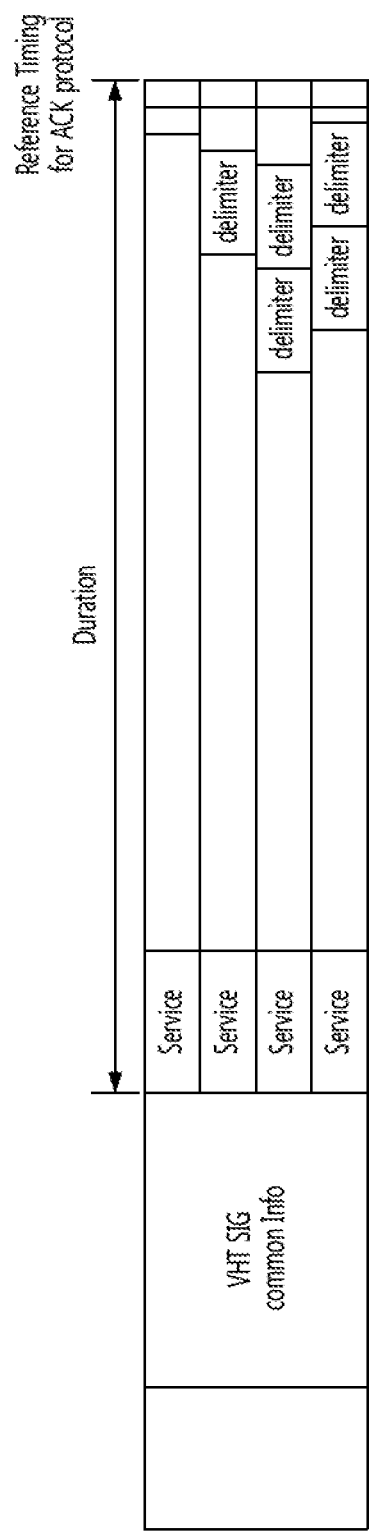
FIG. 1 shows a method for informing about the end of a frame by using a transmission duration and frame padding.

The foregoing and other objects, features, aspects and advantages of the present invention will be described in detail in conjunction with the accompanying drawings, and accordingly, a person skilled in the art to which the present invention pertains will easily implement the technical concept of the present invention. In describing the present invention, if a detailed explanation for a related known function or construction is considered to unnecessarily divert the gist of the present invention, such explanation will be omitted but would be understood by those skilled in the art. The embodiments of the present invention will now be described with reference to the accompanying drawings, in which like numbers refer to like elements in the drawings.

For communication based on the standard IEEE 802.11, various methods are used for a transmitter (or a sending end) to transfer length information to a receiver (or a receiving end). For example, in 802.11b, a PLCP header includes time information having a size of 16 bits, and in 802.11a/g, an L-SIG field of a PLCP preamble includes length information having a size of 12 bits representing the length of a frame by byte. Also, in 802.11n, an HT-SIG field of the PLCP preamble includes length information having a size of 16 bits representing the length of an MPDU or an A-MPDU (Aggregated-MPDU) of the MAC layer by byte.

Meanwhile, in 802.11 ac, multiple input multiple output (MIMO) wireless transmission using multiple antennas is used. In 802.11ac, MIMO is divided into a single user MIMO (SU-MIMO), a 1:1 transmission, and a multi-user-MIMO (MU-MIMO) in which multiple frames are simultaneously transmitted to several users by using spatial division multiple access (SDMA). In 802.11 ac, when SU-MIMO is used, length information may be included in an SIG field for 802.11 ac to inform a receiver about the length of a frame. However, when MU-MIMO is used, since the length of each of the frames transferred to several users may be different, a different method for informing each user about the end of a pertinent frame is required.

When a MU-MIMO downlink transmission section ends, reception those which require a response, among reception terminals (e.g., STAs), may sequentially transmit an ACK protocol to a transmission terminal (e.g., AP). Here, various methods may be used to inform each of the reception terminals about the order and a transmission reference time for transmitting an ACK protocol. For example, information regarding the ACK protocol transmission order may be provided to each of the reception terminals by using a previously transmitted frame. Also, in order to inform each of the reception terminals about a transmission reference time, transmission duration information indicating a point in time at which an MU-MIMO downlink transmission section ends may be included in an SIG field for 802.11ac, whereby information regarding the length of a PPDU transmitted during the longest period of time can be provided to each of the reception terminals. In the case of using such an SIG field, even when a certain reception terminal is allocated a spatial stream having a short length, an actual channel performs transmission during the longest spatial stream, so the channel is in a busy state. When a frame reception of a reception terminal which receives the longest PPDU is terminated, the channel becomes idle, and thereafter, each of the reception terminals transmits an ACK protocol to the transmission terminal according to a determined procedure.

One of the methods for indicating the end of a frame by using a delimiter is recognizing a maximum number of symbols of MU-MIMO transmission through transmission duration information and filling up up to the last symbol of a frame with delimiter padding, MAC padding, and PHY padding. A PHY service data unit (PSDU) transferred from the MAC layer to the PHY layer includes useful data and padding information, and the delimiter padding and MAC padding are classified as non-useful data.

FIG. 1 shows a method for indicating the end of a frame by using transmission duration and frame padding. When a transmitter transmits a frame by using frame padding as shown in FIG. 1, a PHY layer of a receiver cannot know the length of useful data. Thus, a decoder of the PHY layer of the receiver restores delimiter padding, MAC padding, and the last PHY pad bit excluding a tail of the last symbol, as well as the useful data of the received frame. Here, when the PHY pad bit has a size of 7 bits or smaller, which fails to constitute 1 octet, it is discarded, and then other restored data is transferred to a MAC layer. As a result, the PHY layer of the receiver cannot transfer the length of the useful data to the MAC layer through RX VECTOR.

Here, the MAC layer receives a padded MAC frame. Thus, the MAC layer cannot recognize the end of the received frame until it parses the last delimiter of the frame, so it can accurately restore the MAC frame after recognizing the end of the frame. In this method, the length of the frame extends by using a null delimiter applied to the A-MPDU of 802.11n, so in the MAC frame, only A-MPDU, rather than MPDU, should be necessarily used.

In this manner, in the communication method using MIMO, in particular, MU-MIMO, in order to allow the receiver to effectively restore the frame, the information regarding the end of the transmitted frame is required to be accurately provided to the receiver. The present invention relates to a method and apparatus for accurately informing a receiver about the end of a transmitted frame, to thus allow the receiver to effectively restore the frame.

The present invention will now be described in detail through the embodiments.

In MU-MIMO, frames, each having a different length, are simultaneously transmitted to several users, and each frame is transmitted to a reception terminal of each user through beamforming. Here, in order to inform each reception terminal about the end of a frame, the following two methods may be used.

The first method is including, by a PHY layer of a transmitter, a length field in an SIG field or a service field, of each user. The second method is filling, by a MAC layer, a remaining frame with padding information such that it has the same number of OFDM symbols as that of the longest frame among transmitted frames, and transferring the same to the PHY layer. Then, the PHY layer includes information regarding the number of OFDM symbols of each frame in an SIG field, and a MAC layer of a receiver may recognize the end of a received frame by frame parsing.

In the MU-MIMO transmission section, in order to inform the receiver about the end of transmission and the end of MU-MIMO spatial stream, a transmission duration and frame length information are used. When a signal field is transmitted to multiple users, information commonly required for the users is included in a common signal field and information regarding each user is included in a dedicated signal field and transmitted. The transmission duration information is common information of all the terminal participating in the MU-MIMO transmission must know for a clear channel assessment (CCA) deferral, so it is included in the common signal field. Meanwhile, since the lengths of the respective frames are different, the frame length information may be included in per-user information (or per-user info) of the dedicated signal field, e.g., a VHT-SIG field.

Here, the length information may be 1) length information of PSDU, 2) length information of A-MPDU or MPDU among elements constituting the PSDU, or 3) length information of A-MPDU or MPDU, actual data information among MAC padding information. The types of such length information represent an embodiment of the present invention, and various types of information can be expressed according to length expression methods.

Figure 2:
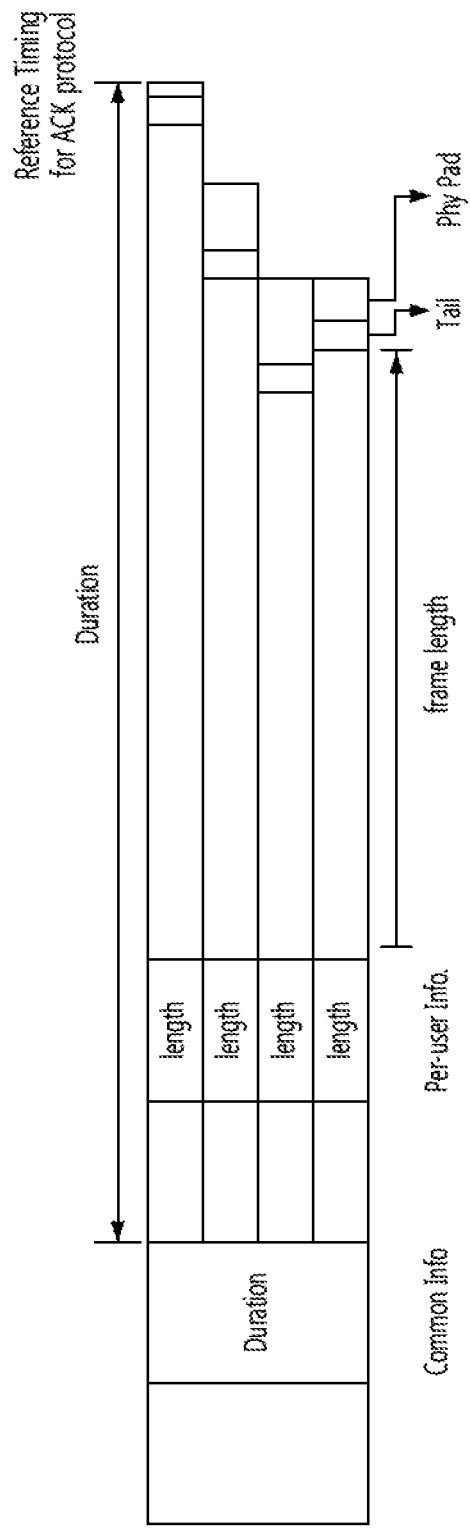
FIG. 2 shows an embodiment in which information regarding the end of a frame is provided to a receiver by using transmission duration information and frame length information according to an embodiment of the present invention.

FIG. 2 shows an embodiment in which information regarding the end of a frame is provided to a receiver by using transmission duration information and frame length information according to an embodiment of the present invention. In the present embodiment, when the transmitter transmits a frame, it includes transmission duration information and frame length information in the VHT-SIG field and transmits the same. The PHY layer of the receiver recognizes a transmission termination time (or a transmitter time) through the transmission duration information and transfers it to the MAC layer. Here, the PHY layer informs the MAC layer about a reference time through an RX-VECTOR or a CCA idle event, and the MAC layer calculates a time at which an ACK protocol is to be transmitted to the transmission terminal by using reference time information.

Also, the PHY layer of the receiver restores the length information and the decoder restores the data by using the restored length information. Here, the MAC layer knows the accurate length of the frame through RX-VECTOR, so there is no need to perform additional delimiter matching in a MAC protocol.

In the embodiment of FIG. 2, the receiver can know the actual length information of the frame by using the length information, the PHY layer can perform decoding only by the designated length and terminate it. Thus, power and time required for decoding can be reduced. Also, the MAC layer does not perform delimiter parsing, the same effect can be obtained.

Figure 3:
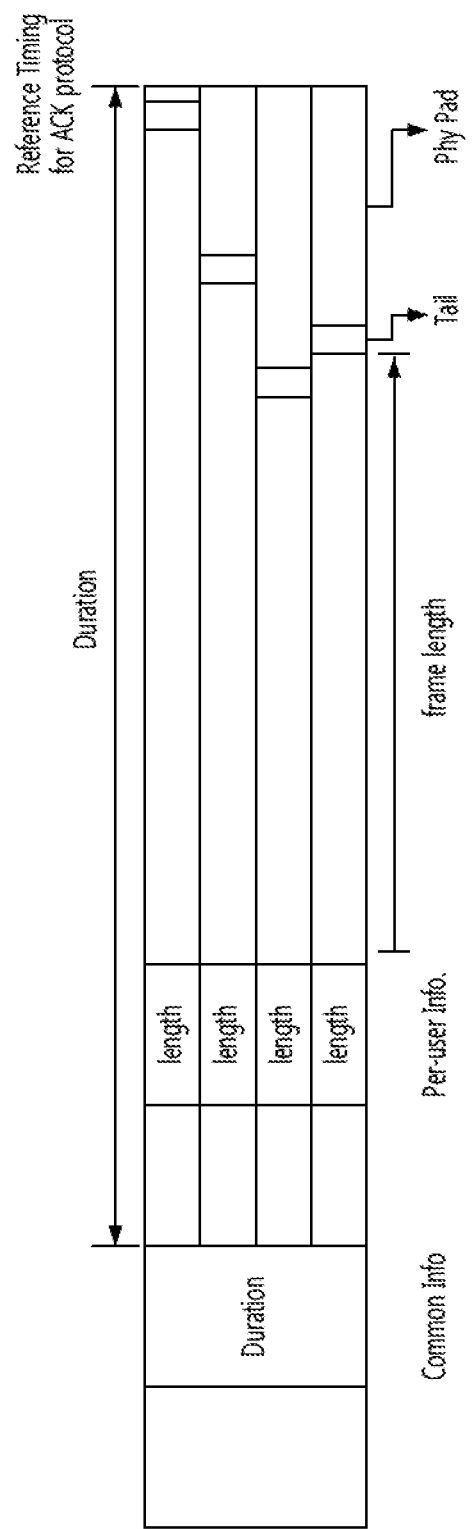
FIG. 3 shows another embodiment in which information regarding the end of a frame is provided to a receiver by using transmission duration information and frame length information according to an embodiment of the present invention.

FIG. 3 shows another embodiment in which information regarding the end of a frame is provided to a receiver by using transmission duration information and frame length information according to an embodiment of the present invention. When transmission of a short stream is first finished in the MU-MIMO transmission section, transmission power of the transmitter is reduced. Accordingly, reception power is also reduced when a corresponding signal is restored in the receiver, and in this case, a problem may arise with a detection of a signal which has not been completely received yet (namely, which is longer than other signals) in the receiver.

Thus, in order to solve the problem, the transmitter fills a spatial stream of each of the other remaining frames, based on a frame having the longest transmission duration, with PHY pad. As a result, frames having the same transmission duration are generated as shown in FIG. 3, so the transmitter can transmit the frames in the transmission duration period by using uniform power. The receiver can stably detect data from a spatial stream having the longest frame, and the reception terminal which receives a short spatial stream does not perform unnecessary decoding through the length information. Here, the PHY pad inserted in the transmitted does not affect the detection of the end of the frame in the receiver.

Figure 4:
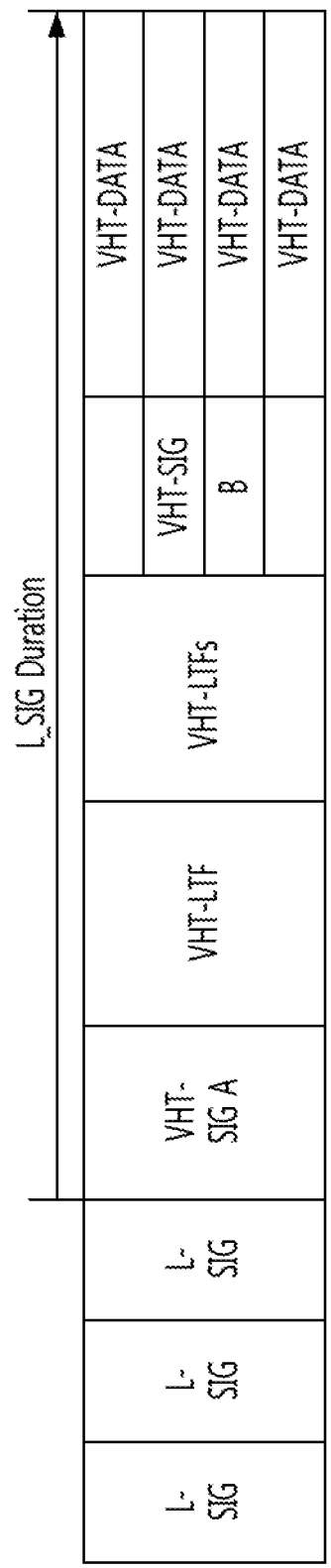
FIG. 4 shows a PPDU format of MU-MIMO to which a data transmission and reception method according to an embodiment of the present invention is applied.

FIG. 4 shows a PPDU format of MU-MIMO to which a data transmission and reception method according to an embodiment of the present invention is applied. In FIG. 4, an L-STF field, an L-LTF field, and an L-SIG field are the same as those of 802.11a/g. Meanwhile, a VHT-SIG A field includes information commonly applied to every user frame, and a VHT-SIG B field provides information required for each user.

In FIG. 4, the VHT-SIG field includes the VHT-SIG A field and the VHT-SIG B field in both SU-MIMO and MU-MIMO systems. The VHT-SIG A and the VHT-SIG B fields are modulated according to BPSK and have a long guard interval.

The VHT-SIG A field has common information applied to every terminal which receives the PPDU. Meanwhile, in the MU-MIMO system, the VHT-SIG B field includes information applied to individual users, respectively, and is transmitted to each user through spatial multiplexing. Multiple users for simultaneous transmission may be limited to four users.

Table 1 below shows the configuration of the VHT-SIG B field used in the SU-MIMO and MU-MIMO systems.

TABLE 2

| SIG B Fields | MU - Bit allocation | | | SU - Bit allocation | | |
|---|---|---|---|---|---|---|
| | 20 MHz | 40 MHz | 80 MHz | 20 MHz | 40 MHz | 80 MHz |
| DWORD(4 bytes) Length | 16 | 17* | 19* | 17 | 19 | 21 |
| MCS | 4 | 4 | 4 | — | — | — |
| RSVD | 0 | 0 | 0 | 2 | 2 | 2 |
| Tail | 6 | 6 | 6 | 6 | 6 | 6 |
| Total # bits | 26 | 27** | 29** | 26 | 27** | 29** |

The VHT-SIG B is modulated according to BPSK. In an embodiment of the present invention, the transmission terminal may variably use a frequency band in data transmission. The number of bits allocated to the VHT-SIG B varies according to a frequency band applied to data transmission. For example, in a 20 MHz mode, 26 bits are allocated to the VHT-SIG B, and in a mode higher than 20 MHz, a frequency tone is added according to channel bonding, so additional bits, besides 26 bits, are allocated. For example, in a 40 MHz mode, 54 bits, the same as those of 802.11n, may be used, and when it is converted into 20 MHz, 27 bits may be used. In an 80 MHz mode, 117 bits may be used, and when it is converted into 20 MHz, 29 bits may be used.

In this manner, as the bandwidth of frequency used for data transmission increases, the amount of transmitted data is also increased, and accordingly, the length of a field representing the length of a frame is to be increased. In order to support the maximum packet duration (5.46 ms) which can be defined in the L-SIG field by a frequency band, bits for defining DWORD are additionally required according to the increase in the band size. Table 1 shows the configuration of the VHT-SIG B field reflecting bits additionally allocated through channel bonding according to each bandwidth.

In the PPDU format of FIG. 4, VHT-DATA is data processed according to a modulation and coding scheme (MCS) of each user, which includes a service field, a PSDU field, a tail field, and a PHY pad field.

Figure 5:
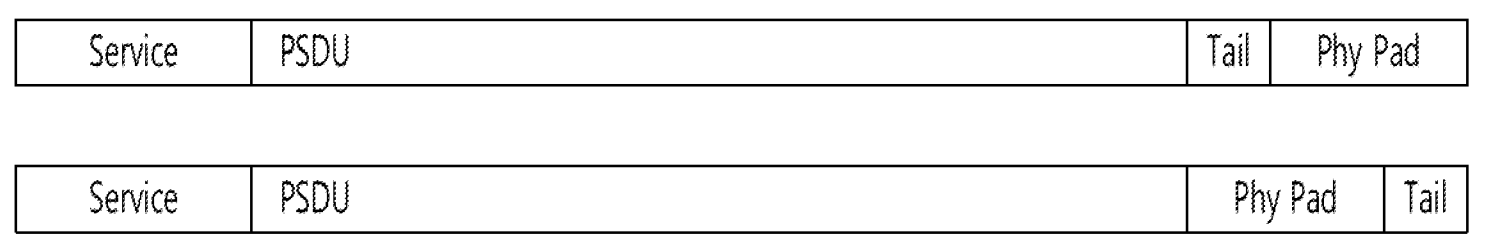

FIG. 5 shows the configuration of the VHT-DATA field according to an embodiment of the present invention. The tail field may be positioned immediately behind the PSDU field or may be positioned at the end of the entire VHT-DATA field according to the method for designating the length. In the latter case, the position of the tail field can be accurately recognized by using the number of symbols and an Ndbps value.

Figure 6:
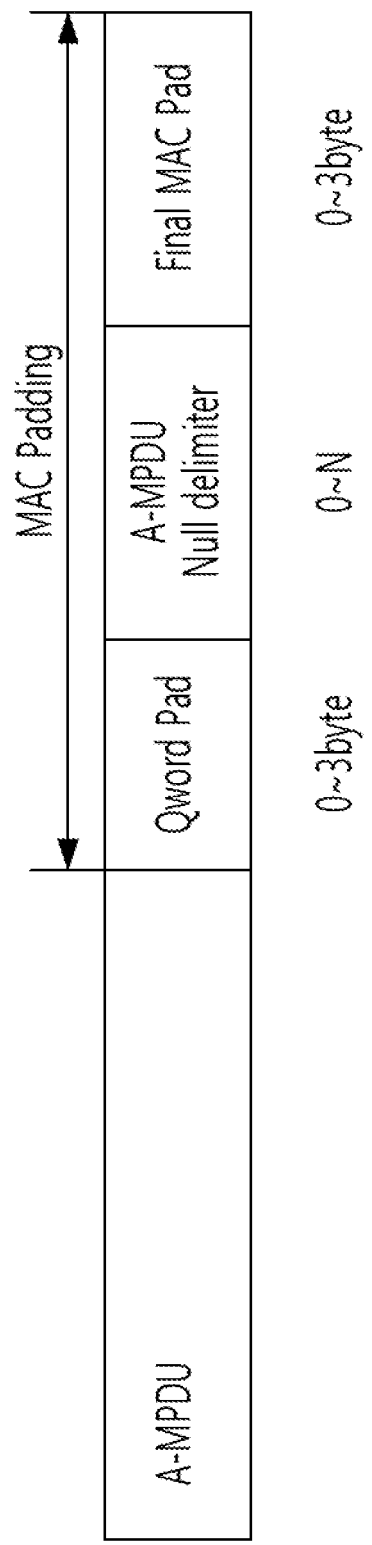
FIG. 6 shows a format of a PHY service data unit (PSDU) included in the VHT-DATA field in FIG. 5.

FIG. 6 shows a format of the PSDU included in the VHT-DATA field in FIG. 5. In FIG. 6, a Qword Pad field, an A-MPDU null delimiter, a final MAC pad field may be selectively added after the A-MPDU. The Qword pad field has the size of a multiple of 4 bytes. The A-MPDU null delimiter is added by the size designated in units of 4 bytes in a 4-byte boundary. The final MAC pad fills a remaining area, failing to reach 4 bytes, with bytes by a designated size.

Hereinafter, diverse representation methods of length information designating the length of a frame included in the PSDU will be described.

Figure 7:
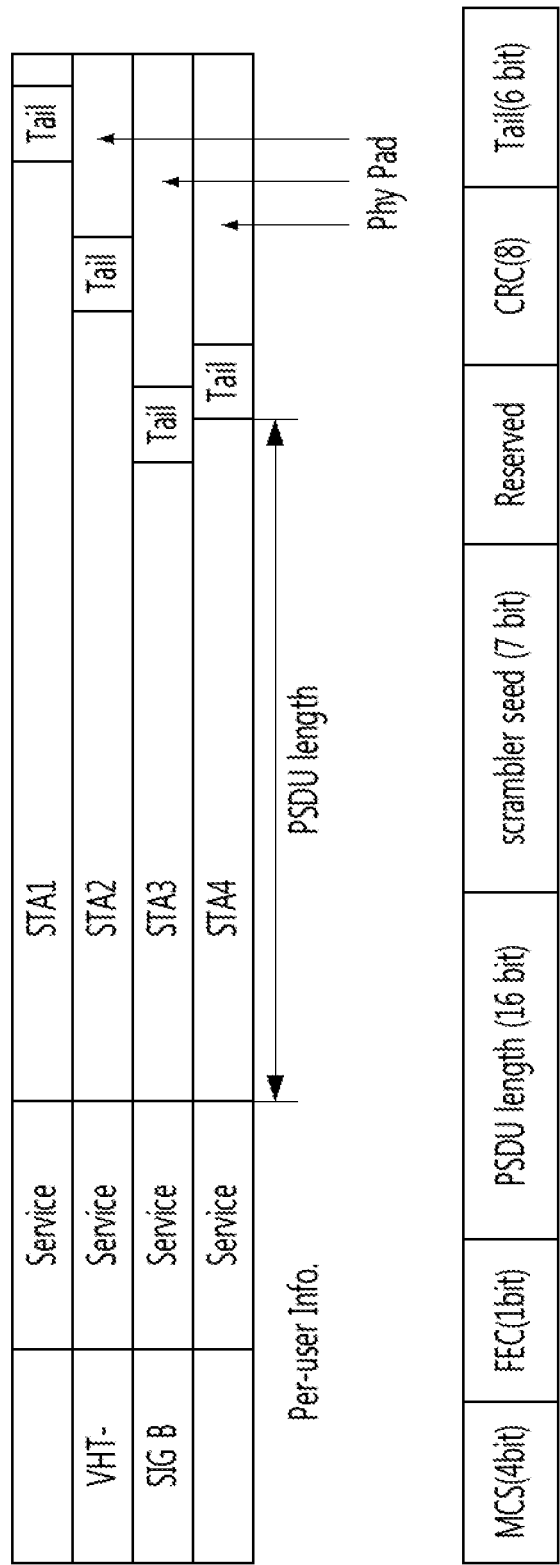
FIG. 7 shows an embodiment in which length information of the PSDU is designated in the VHT SIG-B according to the present invention.

FIG. 7 shows an embodiment in which length information of the PSDU is designated in the VHT SIG-B according to the present invention. In FIG. 7, the length of a frame of each user can be indicated by the VHT-SIG B field, the tail field may be present immediately after the PSDU. The VHT-SIG B field is modulated by BPSK ½, having high reliability, and accordingly an error probability of length information is reduced.

Figure 8:
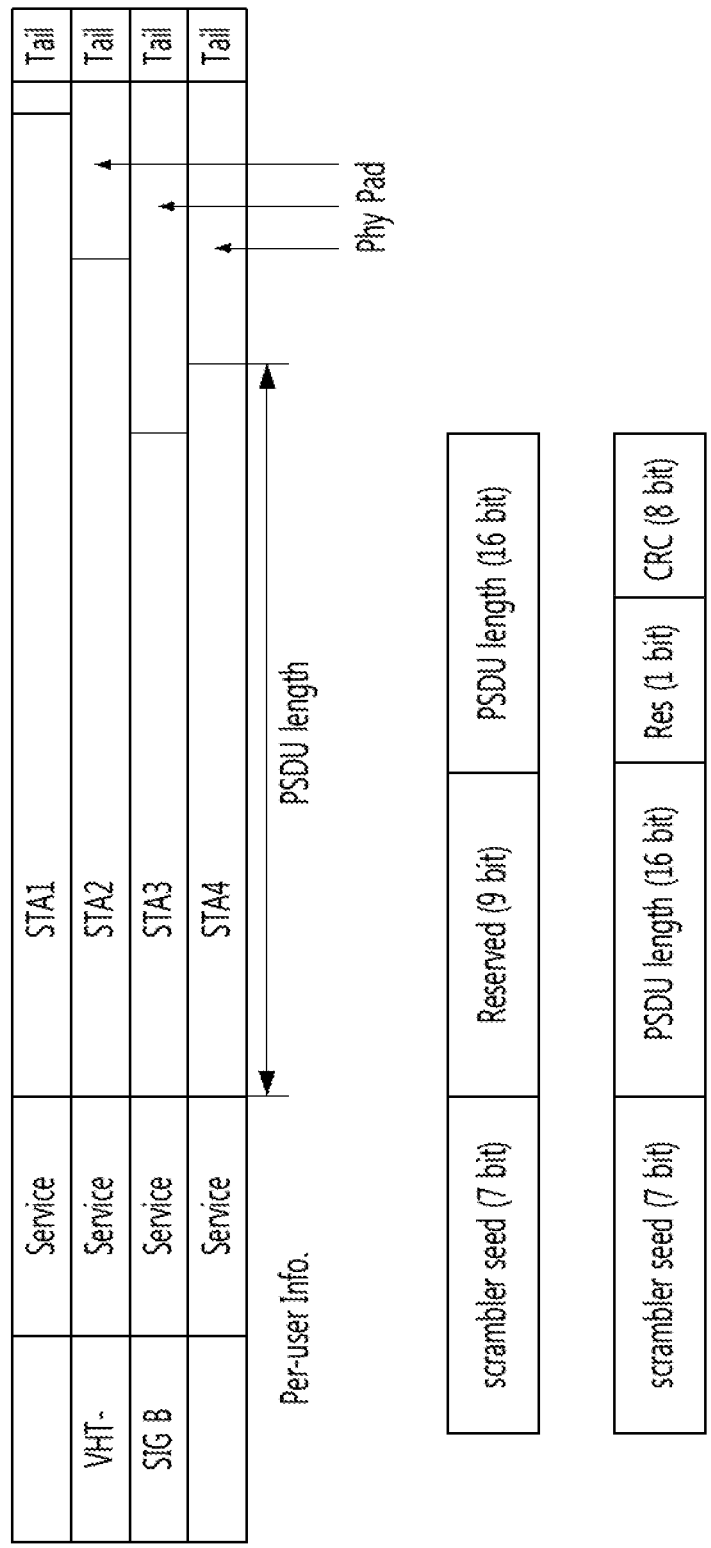
FIG. 8 shows an embodiment in which length information is designated by using a service field according to the present invention.

FIG. 8 shows an embodiment in which length information is designated by using a service field according to the present invention. In FIG. 8, the length information (PSDU length) is included in the service field of the VHT-DATA field. Here, the service field extends from 16 bits to 32 bits.

As shown in FIG. 8, the service field may be configured according to the following two methods.

1) Service field=Scrambler Seed (7 bits)+Reserved (9 bits)+User Length (16 bits)

2) Service field=Scrambler Seed (7 bits)+User Length (16 bits)+CRC (8 bits)

The length information appears after a decoding operation in the service field, so it is positioned at the end of the DATA field. When the service field includes a cyclic redundancy check (CRC), if a CRC error occurs, data processing in the PHY layer is stopped, obtaining power saving effect in the PHY and MAC layers.

Figure 9:
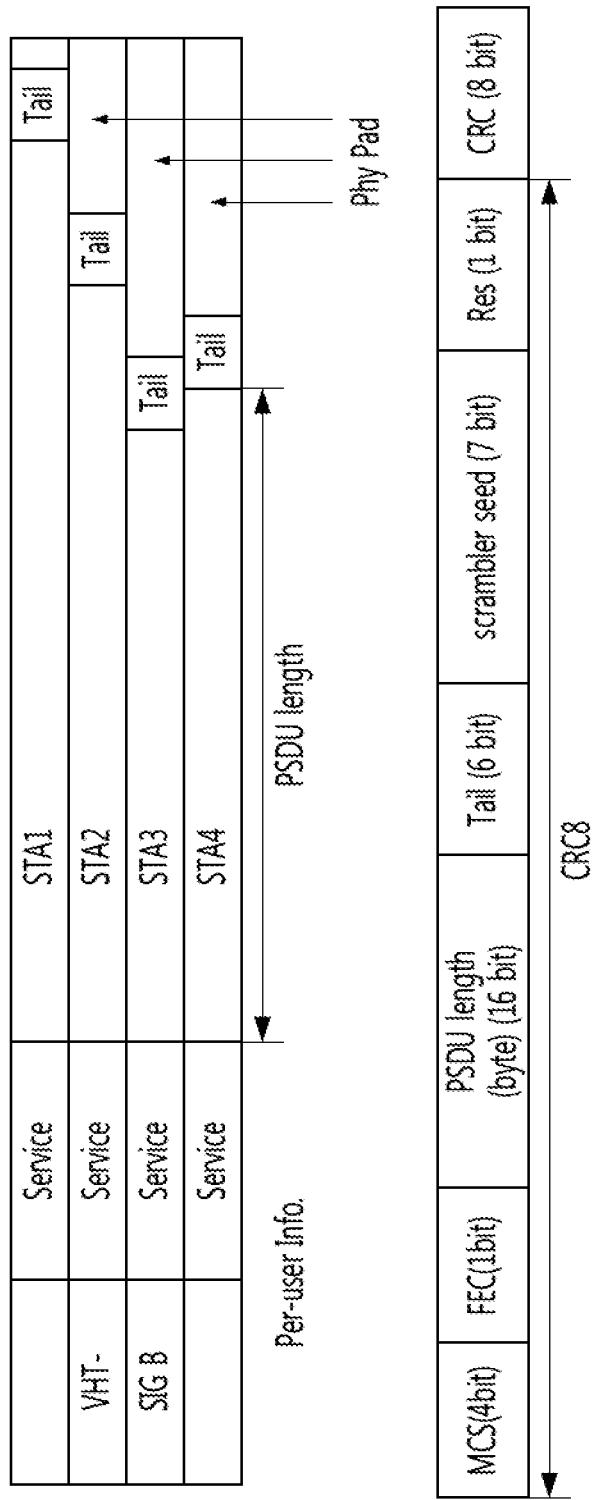
FIG. 9 shows an embodiment in which length information is designated by using both a VHT-SIG B field and a service field according to the present invention.

FIG. 9 shows an embodiment in which length information is designated by using both the VHT-SIG B field and the service field according to the present invention. The VHT-SIG B field has a limited size, so it cannot include a CRC field for error detection. When BPSK ½ modulation is employed, the VHT-SIG B field has a size of 24 bits or 26 bits. When the PSDU length information is included in the VHT-SIG B a shown in FIG. 9, the CRC field may be included in the service field to reduce overhead of the VHT-SIG B. The CRC field having the size of 8 bits is applied to every field of the VHT-SIG B field, a scrambler seed field of the service field, and reserved bits. By protecting the respective fields by using the CRC field, an error detection probability can be enhanced and unnecessary data processing from the PHY layer can be prevented.

In the foregoing embodiment, the CRC field included in the service field can be applied as in the following two embodiments.

1) CRC is applied to MCS, FEC, PSDU length and scrambler seed fields

2) CRC is applied to MCS, FEC, PSDU length fields, excluding service field

Figure 10:
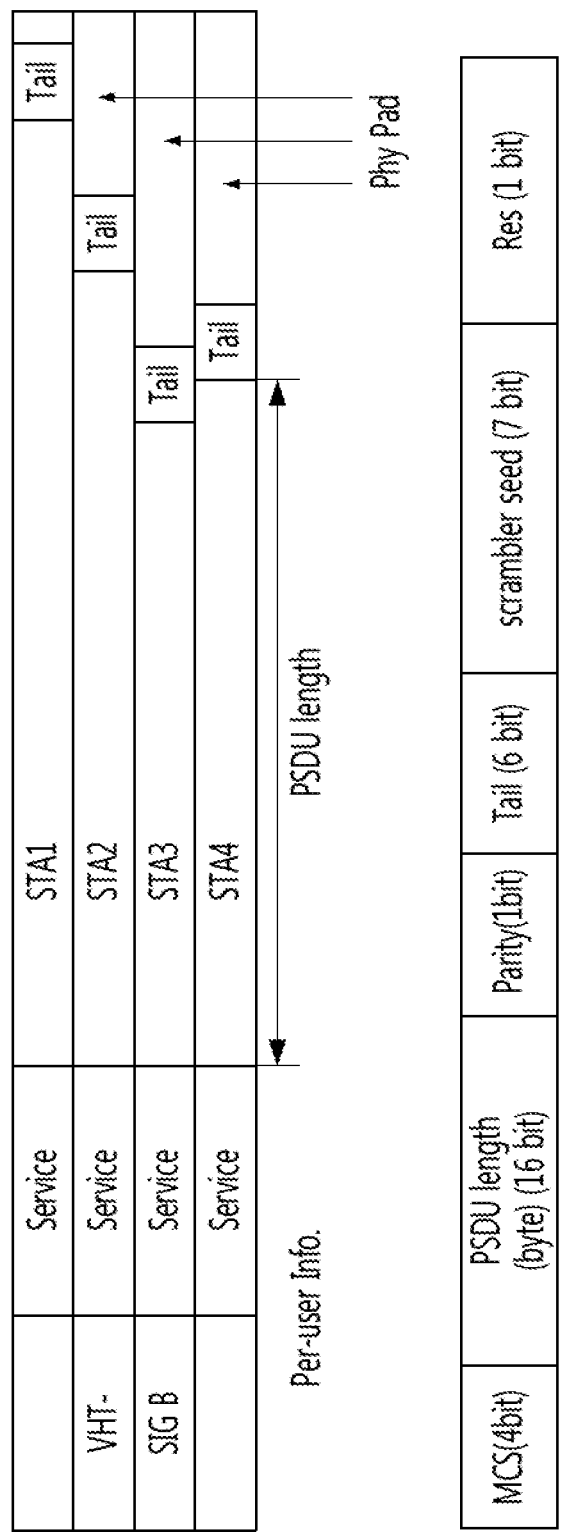
FIG. 10 shows an embodiment in which a length field of a PSDU is protected by using a parity bit according to the present invention.

FIG. 10 shows an embodiment in which a length field of the PSDU is protected by using a parity bit according to the present invention. As shown in FIG. 10, a parity bit (1 bit) may be added behind the PSDU length field to reduce an error in restoring and detecting the PSDU length field.

Figure 11:
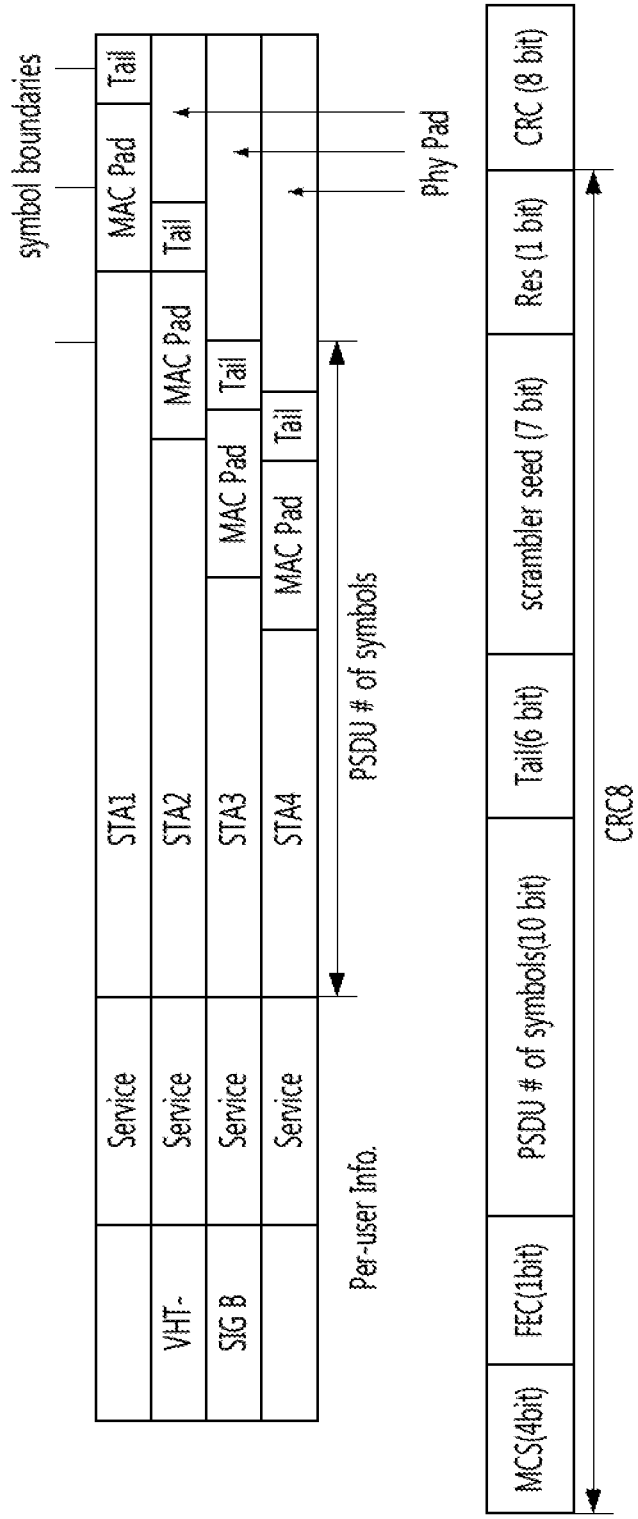
FIG. 11 shows an embodiment in which a symbol length of each user is transferred to the receiver according to the present invention.

FIG. 11 shows an embodiment in which a symbol length of each user is transferred to the receiver according to the present invention. Unlike the foregoing embodiment, in the embodiment of FIG. 11, information regarding the length up to the last symbol including a portion of the PSDU, rather than information regarding the length of the PSDU, is transferred. In this embodiment, the position of the tail field may vary according to the number of symbols occupied by a user frame. In order for a PHY pad field belonging to the last symbol occupied by the PSDU to have a size of 0 to 7 bits, a MAC pad field is padded in units of bytes (See FIG. 6). When the length information is transmitted in units of symbols as in the present embodiment, reserved bits existing in the VHT-SIG B field may be used for a different purpose. Meanwhile, when the MAC pad field is included as shown in FIG. 11, information included in the MAC pad field must be parsed after the PSDU is transferred to the MAC layer of the receiver, potentially generating overhead.

Figure 12:
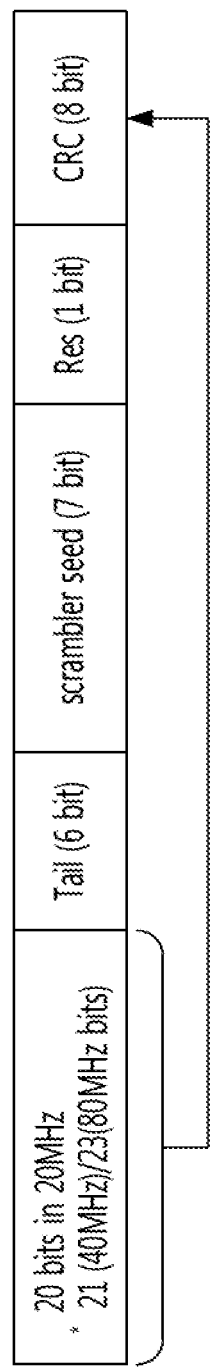
FIG. 12 shows a method for protecting the VHT-SIG B field in the embodiment of FIG. 11.

FIG. 12 shows a method for protecting the VHT-SIG B field in the embodiment of FIG. 11. As shown in FIG. 12, the transmitter includes the CRC field in the service field. Here, the CRC field is calculated based on the VHT-SIG B (excluding the tail field) and inserted into the MSB 8 bits of the service field. Namely, the scrambler seed field is not considered in calculating the CRC field. The service field and the PSDU may be scrambled in the same manner as that of 802.11n.

The CRC field calculated thusly has an effect of protecting an initial state of a scrambler, as well as protecting the VHT-SIG B field. If the CRC field is calculated in consideration of even the scrambler seed field, if there is an error in the initial state of the scrambler, the CRC field has an error after descrambling. Then, a CRC with respect to the VHT-SIG B field also fails. Thus, the CRC field calculated as described above has the effect of detecting even an error of the scrambler.

For reference, the number of octets calculated according to the length field of the VHT-SIG B field cannot be greater, by 3 octets or more, than the number of octets calculated by the L-SIG length and MCS field of the VHT-SIG B field.

Figure 13:
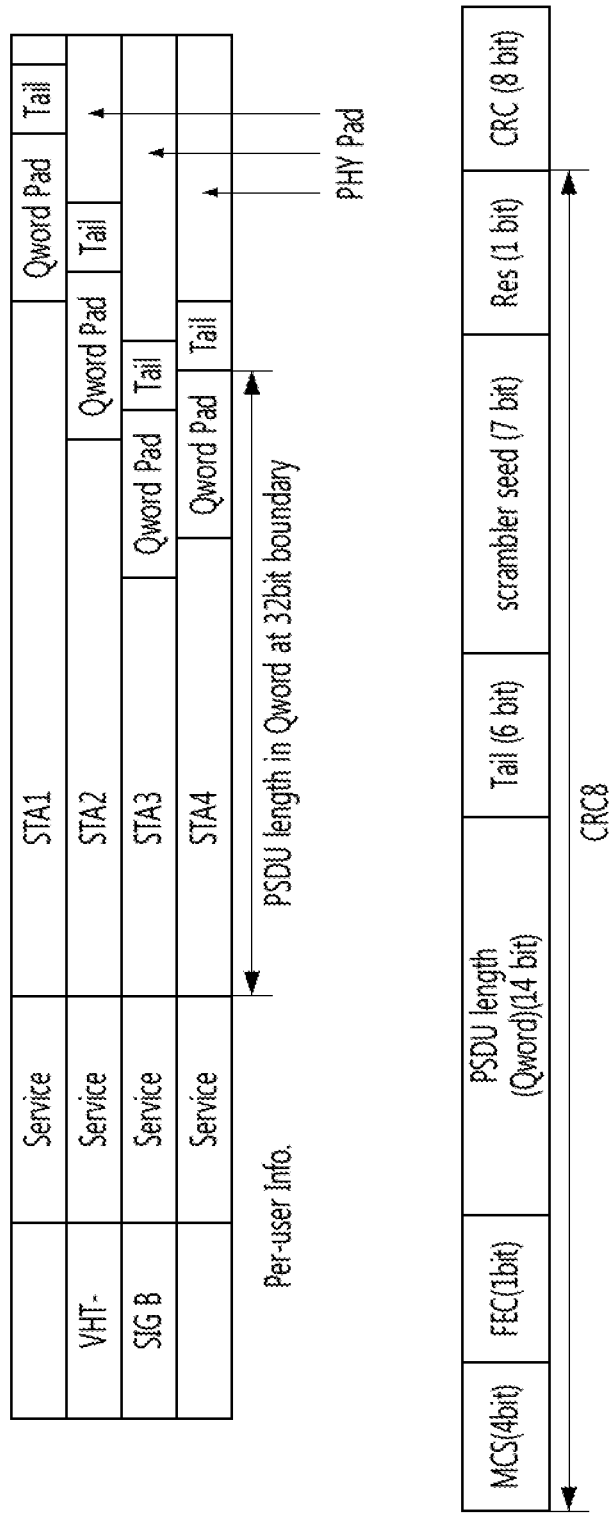
FIG. 13 shows an embodiment in which length information of the PSDU is transmitted in units of Qword (4 bytes) according to the present invention.

FIG. 13 shows an embodiment in which the length information of the PSDU is transmitted in units of Qword (4 bytes) according to the present invention. In the embodiment of FIG. 12, the length information of the PSDU is transmitted by Qword (4 bytes), rather than by byte or symbol. When the length information is transmitted by Qword, the size of the length field is reduced by 2 bits in comparison to the case in which the size of the length field is transmitted by byte. Here, like the embodiment of FIG. 6, the PSDU has a form in which only the Qword pad field is added to the A-MPDU. In the present embodiment, the last Qword has a value of 3 bytes or smaller. Thus, the MAC layer of the receiver does not need to parse the last Qword in parsing the A-MPDU, reducing overhead as compared with the embodiment of FIG. 11.

Figure 14:
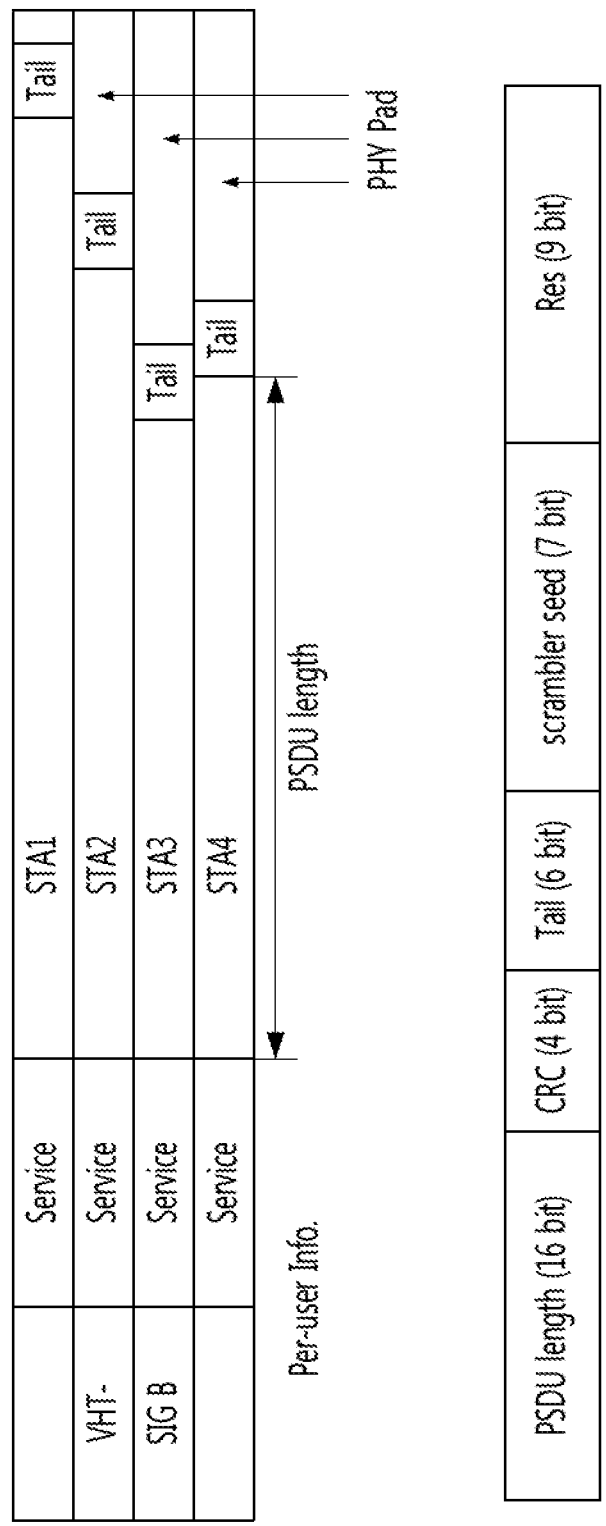
FIG. 14 shows an embodiment in which only the length information of the PSDU is included in the VHT-SIG B field according to the present invention.

FIG. 14 shows an embodiment in which only the length information of the PSDU is included in the VHT-SIG B field according to the present invention. In the embodiment of FIG. 14, only the PSDU length field, the CRC field, and the tail field are included in the VHT-SIG B field having the size of 26 bits. In the present embodiment, the PSDU may be an A-MPDU having a length by byte or may be an (A-MPDU+Qword pad) having a length by Qword. Also, in the present embodiment, the PSDU length field can be protected by the CRC field.

Hereinafter, a method for indicating the end of a frame by using the L-SIG transmission duration field of FIG. 4 and the MAC padding scheme of FIG. 6 will be described with reference to FIG. 15. Also, a method of combining a length indication of each user by using length information having the Qword boundary described above in the embodiment of FIG. 11 will also be described with reference to FIG. 15.

Figure 15:
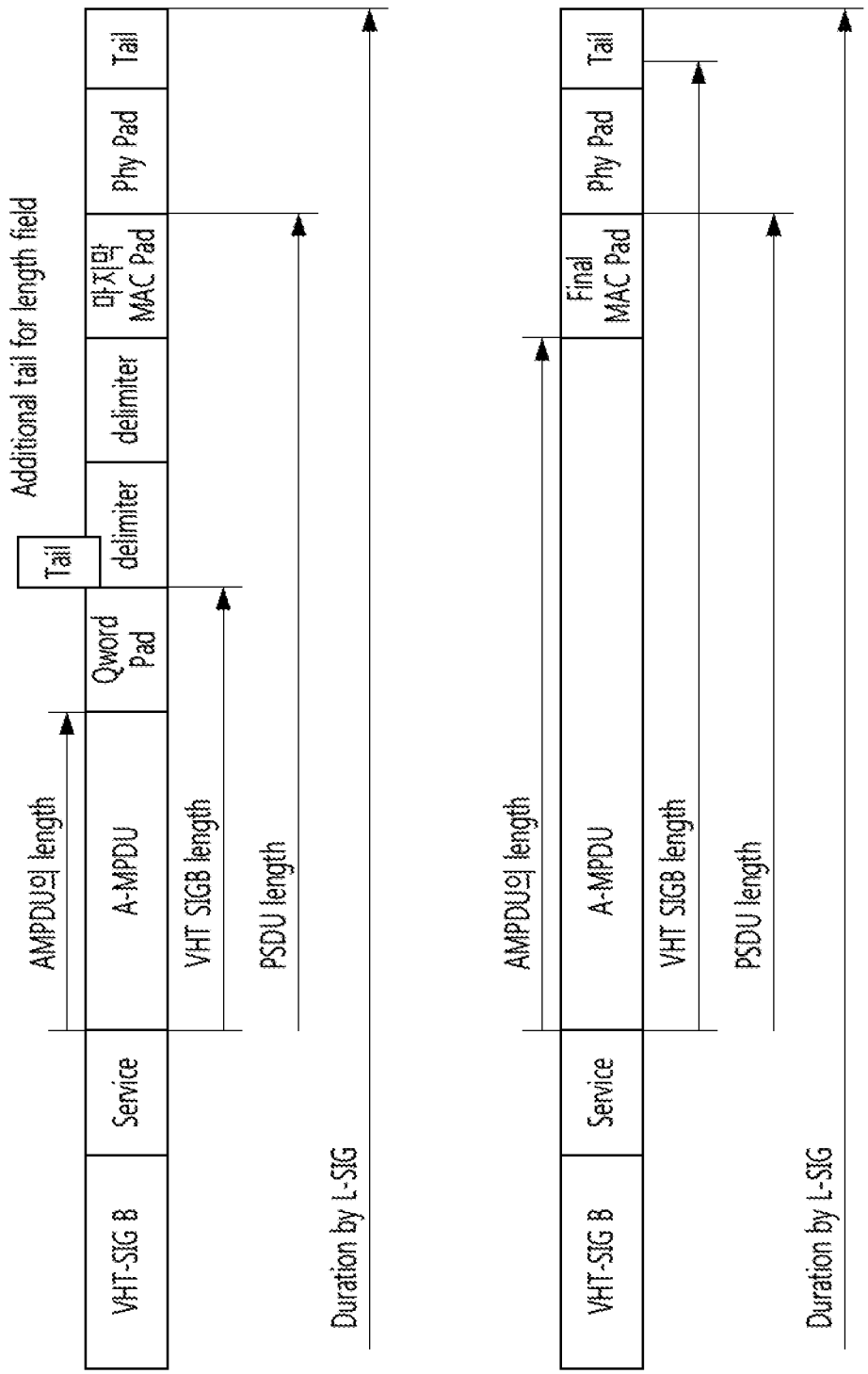
FIG. 15 shows an embodiment in which length information is represented by combining a MAC padding scheme and a length indication scheme according to the present invention.

FIG. 15 shows an embodiment in which length information is represented by combining a MAC padding scheme and a length indication scheme according the present invention. As shown in FIG. 15, when the two methods are combined, a method of using one tail field and a method of using two tail fields can be applied.

In case in which the number of tail fields is one as shown in the frame illustrated at a lower portion in FIG. 15, the VHT DATA field includes service, PSDU, PHY pad, and tail pad in this order. In this case, the PHY layer performs tracing back by using the tail information at the last position, a Viterbi decoder has processing delay to the last. Also, the decoder cannot terminate decoding until it restores data by the length designated in the VHT-SIG B length field. The data decoded by the length designated in the VHT-SIG B length field in the PHY layer is transferred to the MAC layer, and the length of the received frame has a size of Ceiling(A-MPDU_Length/4)*4 (Here, Ceiling( ) refers to a Ceiling function). In this case, the VHT-SIG B length indicates the length of the A-MPDU and Qword pad included in the PSDU format of FIG. 6.

When there is an additional tail field as shown in the frame illustrated at an upper portion in FIG. 15, the tail field may be added to the Qword boundary when the frame is decoded by using the length field in the receiver, thereby removing delay by the length of tracing back in a BCC decoder. Thus, the decoding of the decoder can be terminated faster. When the data is transferred from the PHY layer to the MAC layer, the data can be transferred to the MAC layer as fast as the length or tracing back, and accordingly, the MAC layer can have a gain in terms of the frame processing time.

Meanwhile, when a frame is transferred by using only the L-SIG transmission duration and the MAC padding information without using the length information of each user, the PSDU including MAC padding is entirely transferred to the MAC layer of the receiver. Thus, the MAC layer performs parsing even on the MAC padding, generating overhead.

In the embodiment of FIG. 15, the transmitter configures the PSDU as follows.

1) L_ampdu_x: length of A-MPDU of user x (byte unit)
2) L_psdu_x: A-MPDU of user x+length (byte unit) of PSDU including MAC padding according to FIG. 6
3) Ndpbs_x: a number of data bits per symbol, value (bit unit) of user x according to MCS
4) Nsym: a number of symbols
5) L_padding_x: length (byte unit) (Qword pad, null delimiter) of MAC pad according to MAC padding scheme of FIG. 6, final MAC pad
6) Nes: a number of BCC encoders
7) n number of user frames Meanwhile, the MAC layer performs the MAC padding of FIG. 6 as follows.

1) Nsym_x=Ceiling((16+8×L_ampdu_x+6*Nes)/Ndpbs_x)
2) Nsym=max(Nsym_1, . . . , Nsym_n)
3) L_padding_x=round((Nsym×Ndpbs_x−16−6*Nes)/8)−L_ampdu_x Here, L_padding_x designates the size of MAC padding to be included for the user x.

In the above process, a PSDU for the user x is generated by inserting an appropriate padding according to the size of L_padding_x and the boundary of L_ampdu_x.

Meanwhile, a padding insertion algorithm of the MAC layer is as follows.

If (Ceiling(L_ampdu_x/4)*4<=(L_ampdu_x+L_padding_x)
Insert Qword pad
Else
Insert final MAC pad of L_padding_x bytes and complete generation of PSDU When a remaining padding space is greater than or equal to 4 bytes, a null delimiter in units of 4 bytes is inserted. Also, when a space of 3 bytes or smaller remains, a byte final MAC pad is inserted to complete the generation of PSDU.

The MAC layer of the transmitter transmits Nsym, L_ampdu_x, MCS per user, and PSDU per user to the PHY layer through the TXVECTOR. The PHY layer of the transmitter inserts a PHY pad by Npad_x and inserts a tail pad having the size of 6*Nes according to the results of the following formula.

L_qwordinB: It is value indicating A-MPDU length by Qword in the Qword boundary and is transmitted through VHT-SIG B Npad_x: length (bit unit) of PHY pad of user x Nsym=information transferred to a receiver through L-SIG transmission duration information Ndata_x=Nsym×Ndbps_x Npad_x=(Ndata_x−(16+6*Nes)) % 8; PHY Pad(0~7)

L_qwordinB=Ceiling(L_ampdu_x/4)

When an additional tail pad is required, a position to be substituted by the tail pad is determined according to the following conditions.

If (L_psdu_x>=L_qwordinB*4)

First tail position=N_pos_first_tail=16+32×L_qwordinB

Else

Do nothing

The additional tail pad substitutes MAC padding, so the A-MPDU, an actual user frame, is transferred as it is. The MAC padding is merely padding information, rather than meaningful data, so it does not affect the user data transmission. In case in which a front portion of a first null delimiter of the MAC padding is substituted, when only the L-SIG transmission duration and the MAC padding are used, the null delimiter is recognized as an error and the procedure is continuously performed until a next null delimiter.

The position to be substituted by the last tail pad is determined by following formula.

Second tail position=N_pos_second_tail=Ndata_x−6*Nes

The receiver can discriminate the length of a user frame as follows according to a method of detecting the end of the frame. Here, the size of data transferred to the MAC layer is determined according to the length of the user frame.

In the reception terminal using the VHT-SIG B length information of each user, Rx Vector Length, the length of the user frame, transferred to the MAC layer is determined by the following formula.

If (L_psdu_x>=L_qwordinB*4)

Rx vector length=L_qwordinB*4 (byte unit)

Tail position=16+32×L_qwordinB (bit unit)

Else

Rx vector length=round ((Nsym×Ndpbs_x−16−6*Nes)/8) (byte unit)

Tail position=Ndata_x−6

When the MAC padding is applied to the L-SIG transmission duration, Rx Vector Length, the length of the user frame, transferred to the MAC layer in the receiver is determined by the following equation.

Rx vector length=round ((Nsym×Ndpbs_x−16−6*Nes)/8) (byte unit)

Tail position=Ndata_x−6

Figure 16:
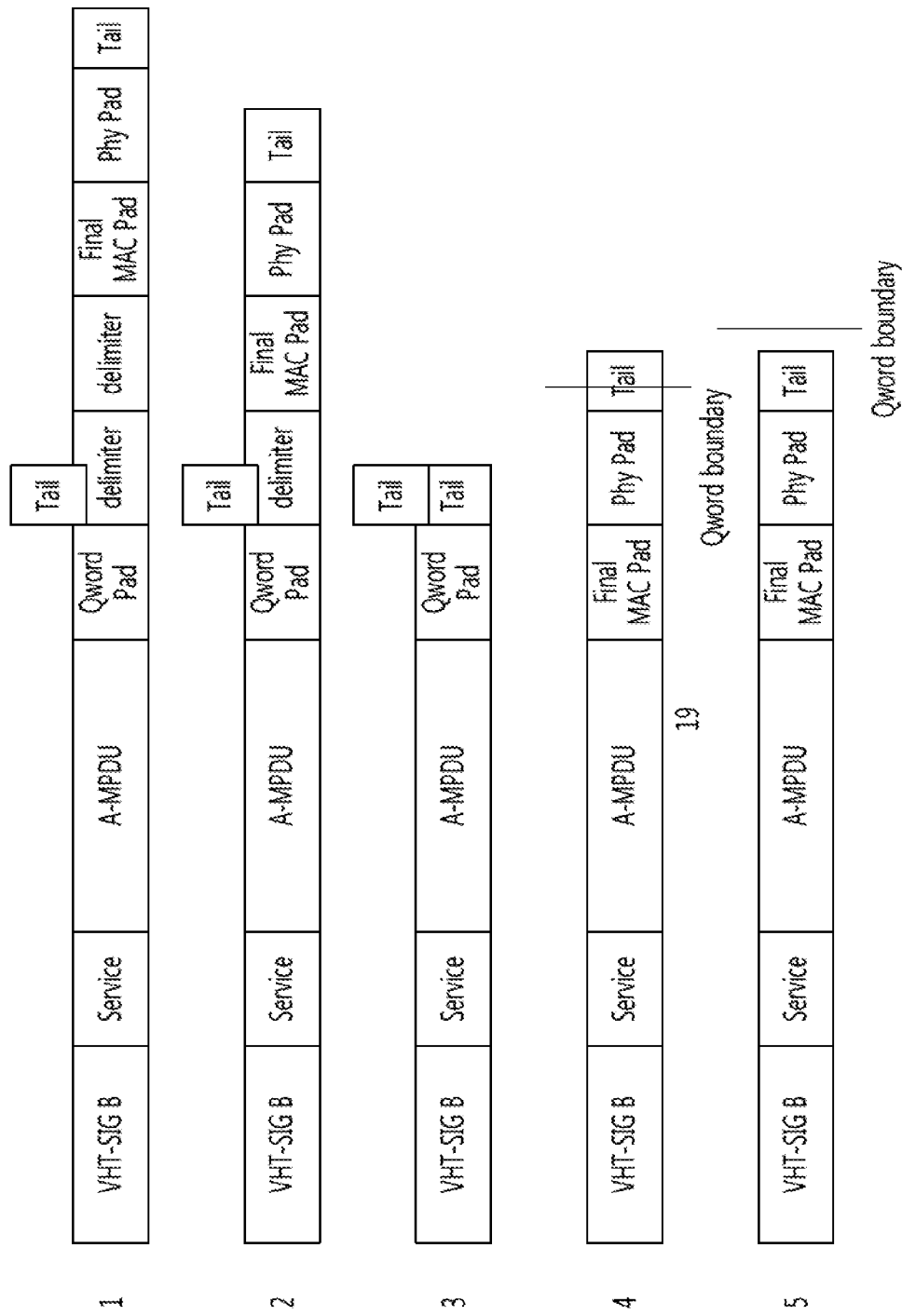
FIG. 16 shows embodiments in which an additional tail pad of FIG. 15 is substituted according to the present invention.

FIG. 16 shows embodiments in which the additional tail pad of FIG. 15 is substituted according to the present invention.

Figure 17:
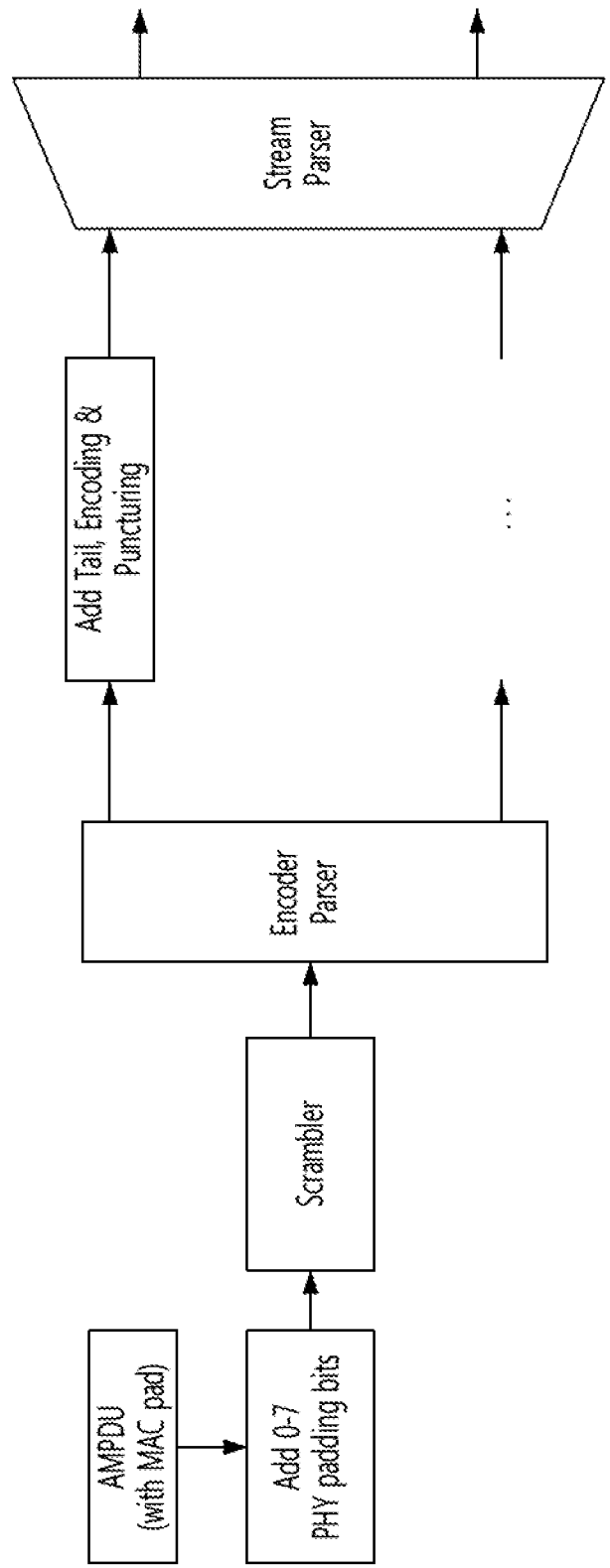
FIG. 17 is a block diagram for explaining an insertion of a PHY pad performed in a PHY layer.

FIG. 17 is a block diagram for explaining an insertion of the PHY pad performed in a PHY layer. When the MAC pad and the PHY pad bits are included, BCC and LDPC codes are required to be all encoded. Thus, the PHY pad is inserted before scrambler. Upon receiving the frame generated thusly, a decoder of the receiver performs decoding by using the length information of the VHT-SIG B field, so the PHY layer can obtain power saving effect.

In the case of encoding using BCC, as shown in FIG. 17, the PHY pad (0~7 bits) is positioned behind the PSDU, and thereafter, the tail bits (6NES bits) are added. The padding bits are added in front of the scrambler, and the six tail bits are added before each encoder. The LDPC code does not have a tail bit like in 802.11n.

Figure 18:
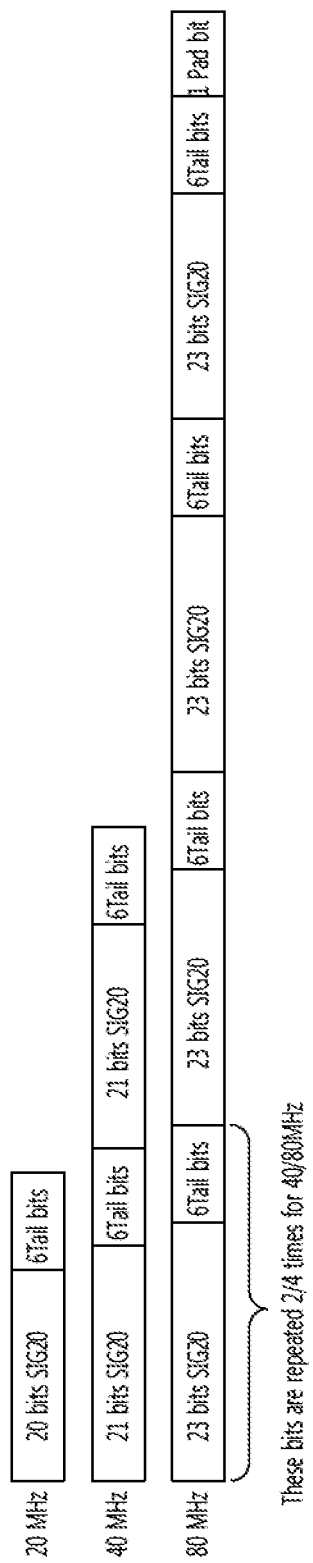
FIG. 18 shows a modulation scheme of the VHT-SIG B and a data representation scheme according to bandwidth.

FIG. 18 shows a modulation scheme of the VHT-SIG B and a data representation scheme according to a bandwidth. As described above, in an embodiment of the present invention, the transmission terminal can variably use a frequency band in transmitting data. FIG. 18 shows VHT-SIG B field configurations when frequency bands applied for transmission are 20 MHz, 40 MHz, and 80 MHz, respectively. In FIG. 18, each VHT-SIG B includes an SIG20 field converted into 20 MHz and a tail field having the size of 6 bits.

As shown in FIG. 18, in the 40 MHz and 80 MHz modes, the information of the VHT-SIG B field including the tail field is iterated. Although not shown in FIG. 18, when frequency is 160 MHz, VHT-SIG B of 80 MHz is iterated twice.

As the VHT-SIG B field is iterated in the 40 MHz and 80 MHz modes, an error restoration probability can be enhanced through repetition code in the receiver. Namely, the decoder of the reception terminal can iteratively use the value obtained through decoding, thereby effectively enhance an error decision value used in a decoder input.

Figure 19:
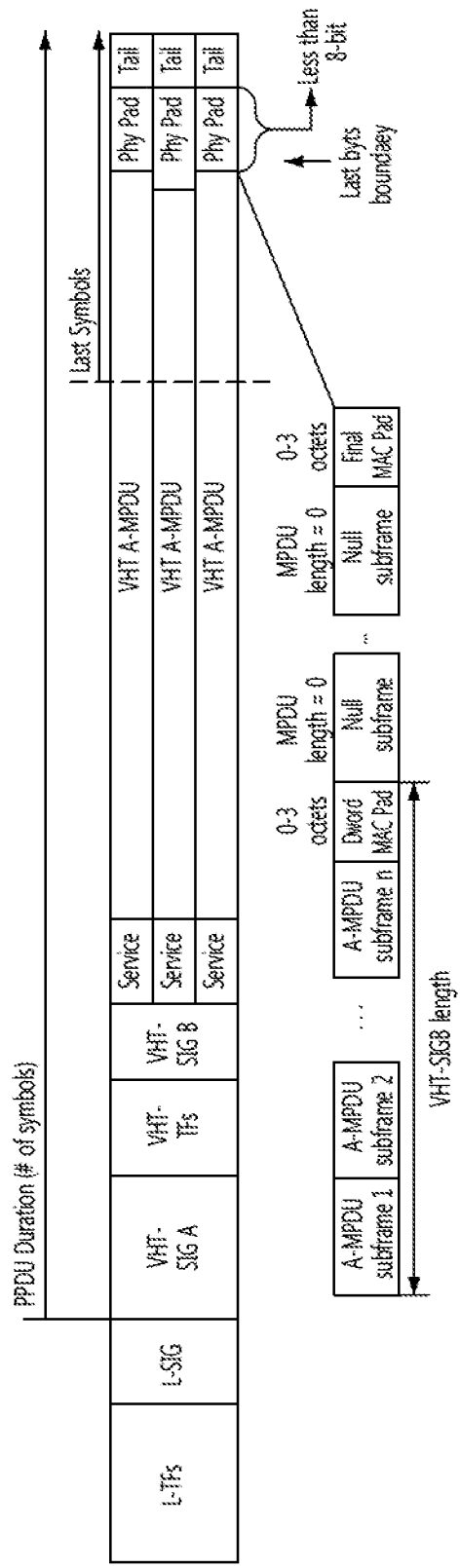
FIG. 19 illustrates a PPDU format according to an embodiment of the present invention.

FIG. 19 illustrates the PPDU format according to an embodiment of the present invention. As shown in FIG. 19, the reception terminal sets CCA deferral by using the LSIG-LENGTH transmission duration information and performs L-SIG protection. Length and rate information included in the L-SIG field of FIG. 19 designates a transmission duration of the PPDU, and in case of OFDM symbols having a long guard interval, the length and rate information included in the L-SIG field of FIG. 19 designate the number of symbols.

The MAC layer provides a VHT A-MPDU included in the last byte of each user stream. The same preamble structure and the same VHT A-MPDU format are used in the VHT-frame of a single user (SU) and multiple users (MU). Here, since the A-MPDU is used all the time, an aggregation bit indicating whether or not the A-MPDU is used is not included in the VHT-SIG field. The PHY layer provides a PHY pad of 0 to 7 bits. The PHY pad is positioned in front of the tail field.

The PHY layer of the reception terminal decodes only the useful data part by using the DWORD length included in the VHT-SIG B and the transfers the same to the MAC layer. Here, a delimiter and a padding part behind the useful data are not decoded and PHY processing is stopped, obtaining a power saving effect.

Figure 20:
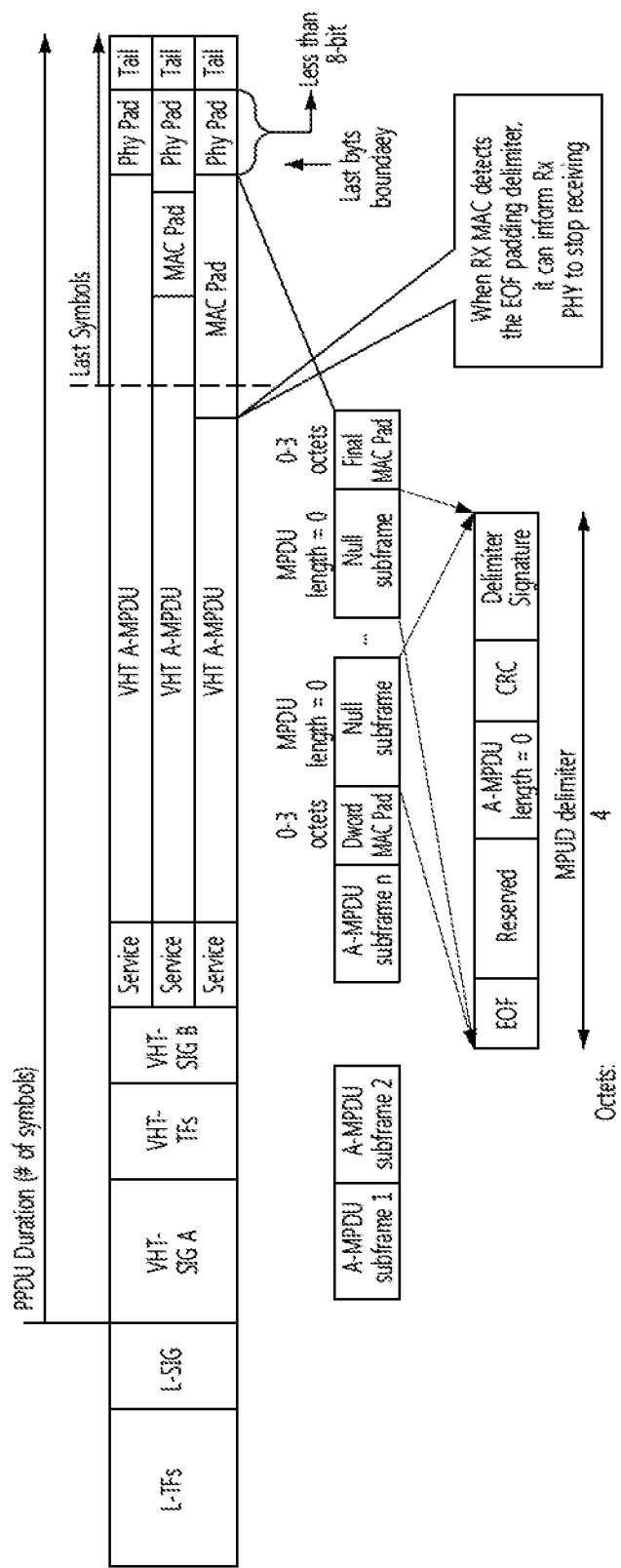
FIG. 20 illustrates a PPDU format according to another embodiment of the present invention.

FIG. 20 illustrates a PPDU format according to another embodiment of the present invention.

The use of the length field of VHT-SIG B as shown in FIG. 19 can obtain a power saving effect in the PHY layer. Meanwhile, the use of the PPDU format as shown in FIG. 20 can obtain a power saving effect even in the MAC layer.

In FIG. 20, a Null subframe positioned at the end of the A-MPDU is used as a special padding delimiter having EOF flag information. When the MAC layer of the receiver detects the padding null delimiter including the EOF flag, the MAC layer transmits an operation stop signal to the PHY layer, obtaining a power saving effect.

Figure 21:
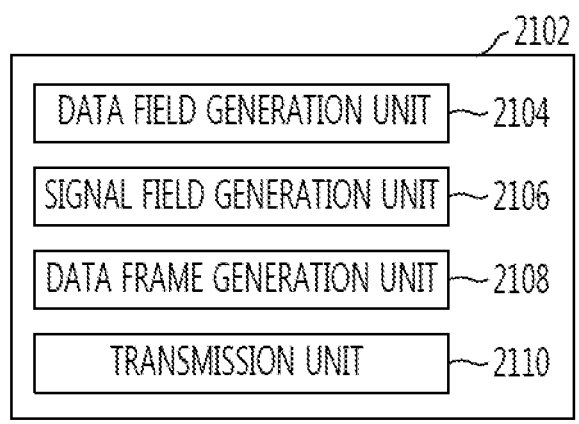
FIG. 21 shows the configuration of a transmission terminal according to an embodiment of the present invention.

FIG. 21 shows the configuration of a transmission terminal according to an embodiment of the present invention.

A transmission terminal 2102 includes a data field generation unit 2104, a signal field generation unit 2106, a data frame generation unit 2108, and a transmission unit 2110. The data field generation unit 2104 generates a data field including data (e.g., A-MPDU) desired to be transmitted to a reception terminal. Here, the data field may include a service field and a PHY service data unit (PSDU) field, and the PSDU field may include data desired to be transmitted to the reception terminal.

The data field generation unit 2104 may generate a PSDU field as described above in the embodiment of FIG. 15. The data field generation unit 2104 first calculates the size of an MAC padding to be added behind the data included in the PSDU as follows.

1) Nsym_x=Ceiling((16+8×L_ampdu_x+6*Nes)/Ndpbs_x)

2) Nsym=max(Nsym_1, . . . , Nsym_n)

3) L_padding_x=round((Nsym×Ndpbs_x−16−6*Nes)/8)−L_ampdu_x

Thereafter, the data field generation unit 2104 adds a Qword pad, a Null delimiter, and a final MAC pad behind the data according to the size of the MAC padding as follows.

If (Ceiling(L_ampdu_x/4))*4<=(L_ampdu_x+L_padding_x)

Insert Qword pad

Else

Insert final MAC pad of L_padding_x byte and complete generation of PSDU

When a remaining padding space is greater than or equal to 4 bytes, the data field generation unit 2104 inserts a null delimiter in units of 4 bytes. Also, when a space of 3 bytes or smaller remains, the data field generation unit 2104 inserts a byte final MAC pad and completes the generation of the PSDU.

The signal field generation unit 2106 generates a signal field including information regarding the data field generated by the data field generation unit 2104. Here, the signal field may include a length field designating the size of the data and Qword pad included the PSDU field. Also, the signal field may further include a modulation and coding scheme (MCS) field including information regarding a modulation and coding method of the data field. Also, the service field may include a CRC bit calculated based on the information included in the signal field.

The data frame generation unit 2108 generates a data frame including the generated data field and signal field. The transmission unit 2110 transmits the data frame generated by the data frame generation unit 2108 to the reception terminal.

Figure 22:
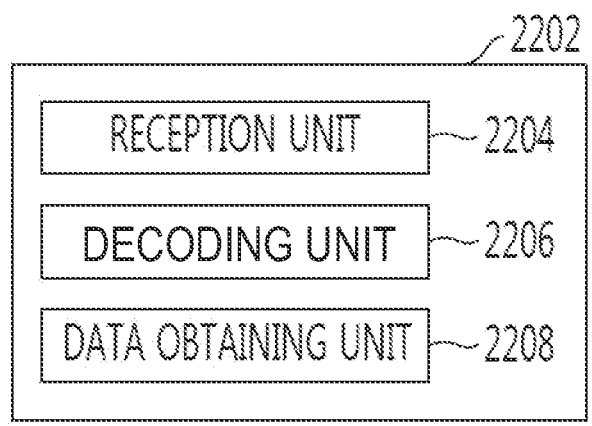
FIG. 22 shows the configuration of a reception terminal according to an embodiment of the present invention.

FIG. 22 shows the configuration of a reception terminal according to an embodiment of the present invention.

A reception terminal 2202 includes a reception unit 2204, a decoding unit 2206, and a data obtaining unit 2208. The reception unit 2204 receives a data frame including a data field including data (e.g., an A-MPDU) intended to be transmitted by a transmission terminal and a signal field including information regarding the data field from the transmission terminal.

The decoding unit 2206 decodes the data frame received by the reception unit 2204 and outputs the signal field and the data field. Respective fields included in the signal field and the data field have been described above with reference to FIG. 21.

The data obtaining unit 2208 obtains the data from the data field by using the signal field output by the decoding unit 2206.

Figure 23:
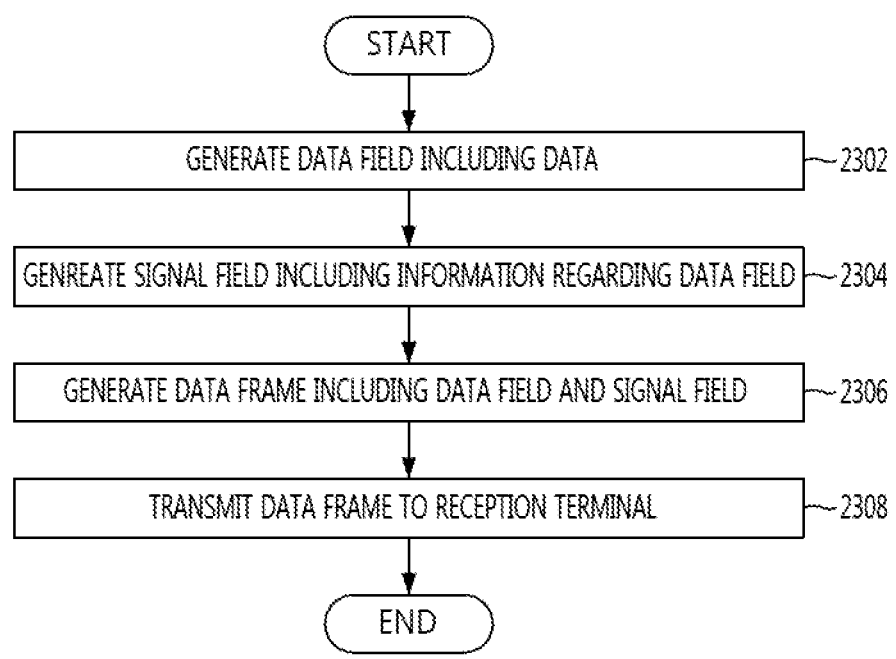
FIG. 23 is a flow chart illustrating a process of a data transmission method according to an embodiment of the present invention.

FIG. 23 is a flow chart illustrating a process of a data transmission method according to an embodiment of the present invention.

First, a data field including data (e.g., an A-MPDU) intended to be transmitted to a reception terminal is generated (2302). A signal field including information regarding the generated data field is generated (2304). Thereafter, a data frame including the generated data field and signal field is generated (2306).

Here, the data field includes a service field and a PSDU field, and the PSDU field includes the data intended to be transmitted to the reception terminal. Also, the PSDU field includes the data intended to be transmitted to the reception terminal and a Qword pad, a Null delimiter, and a final MAC pad added behind the data. Also, the signal field may include a length field designating the size of the data and the Qword pad included in the PSDU field and an MCS field including information regarding a modulation and coding method of the data field. Also, the service field may include CRC bits calculated based on the information included in the signal field.

Finally, the generated data frame is transmitted to the reception terminal (2308).

Figure 24:
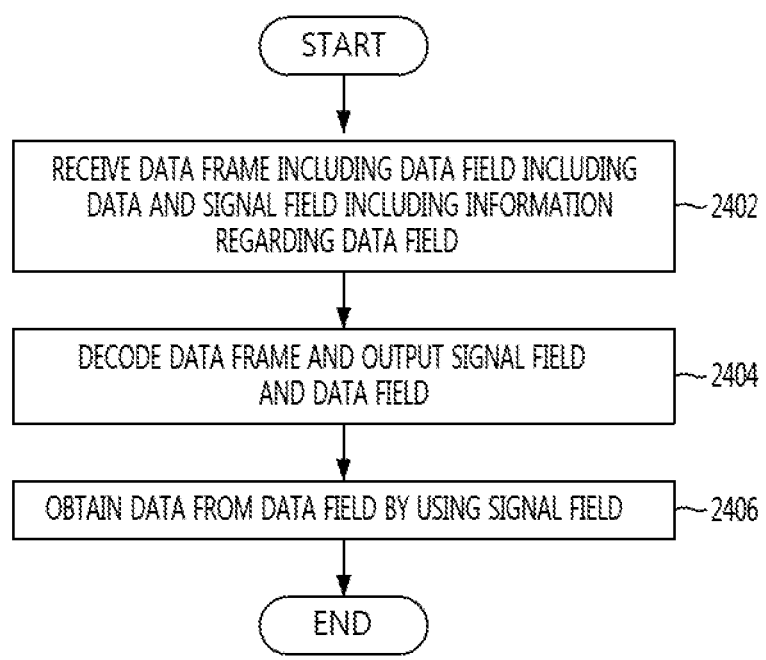
FIG. 24 is a flow chart illustrating a process of a data reception method according to an embodiment of the present invention.

FIG. 24 is a flow chart illustrating a process of a data reception method according to an embodiment of the present invention.

First, a data frame including a data field including data (e.g., A-MPDU) intended to be transmitted by a transmission terminal and a signal field including information regarding the data field is received (2402). The received data frame is decoded to output the signal field and the data field included in the data frame (2404).

Here, the data field includes a service field and a PSDU field, and the PSDU field includes the data intended to be transmitted by a transmission terminal. Also, the PSDU field includes the data intended to be transmitted to a reception terminal and a Qword pad, a Null delimiter, and a final MAC pad added behind the data. Also, the signal field may include a length field designating the size of the data and the Qword pad included in the PSDU field and an MCS field including information regarding a modulation and coding method of the data field. Also, the service field may include CRC bits calculated based on the information included in the signal field.

Finally, the data is obtained from the data field by using the output signal field (2406).

While the present invention has been shown and described in connection with the embodiments, it will be apparent to those skilled in the art that modifications and variations can be made without departing from the spirit and scope of the invention as defined by the appended claims.

The invention claimed is:

1. A method for communicating over a wireless local area network, the method comprising:
   generating a Very High Throughput Signal B (VHT-SIG-B) field including control information and a tail field;
   generating a data field including a service field and a physical layer convergence protocol physical service data unit (PSDU), the service field including scrambling information and a cyclic redundancy check (CRC), the CRC being calculated based on the control information;
   generating a scrambling sequence which is initialized based on the scrambling information;
   generating a scrambled data field by scrambling the service field with the scrambling sequence;
   generating a frame including the VHT-SIG-B and the scrambled data field; and
   transmitting the frame over an operating channel.

2. The method of claim 1, wherein the VHT-SIG-B field includes a block of bits, and wherein a bit number of the block of bits is determined based on a channel bandwidth of the operating channel.

3. The method of claim 2, wherein the bit number of the block of bits is 26 bits if the channel bandwidth is 20 MHz.

4. The method of claim 2, wherein the bit number of the block of bits is 27 bits if the channel bandwidth is 40 MHz.

5. The method of claim 2, wherein the bit number of the block of bits is 29 bits if the channel bandwidth is larger than 40 MHz.

6. The method of claim 2, wherein the block of bits is repeated a predetermined number of times in accordance with the channel bandwidth of the operating channel.

7. The method of claim 6, wherein the block of bits is repeated twice if the channel width of the operating channel is 40 MHz.

8. The method of claim 6, wherein the block of bits is repeated four times if the channel width of the operating channel is 80 MHz.

9. The method of claim 8, wherein the repeated block of bits is repeated twice if the channel width of the operating channel is 160 MHz.

10. The method of claim 1, wherein the number of bits for the scrambling information is 7, the number of bits for the CRC is 8, and the number of bits for the tail field is 6.

11. The method of claim 1, wherein the VHT-SIG-B field is generated user-specifically.

12. The method of claim 1, wherein the PSDU is generated by adding padding bits to a data block, and
wherein the control information includes a length field indicating a length of the data block.

13. The method of claim 12, wherein the PSDU is for multi-user multiple input multiple output (MU-MIMO) transmission and a maximum number of users for the PSDU is four.

14. The method of claim 12, wherein the PSDU is scrambled with the scrambling sequence.

15. The method of claim 1, wherein the frame is transmitted as a PLCP protocol data unit (PPDU).

16. The method of claim 1, wherein the VHT-SIG-B field is modulated with a binary phase shift keying (BPSK).

17. The method of claim 1, wherein an orthogonal frequency-division multiplexing (OFDM) symbol for the VHT-SIG-B field has a long guard interval.

18. An apparatus for a wireless local area network, the apparatus comprising:
a signal field generation unit configured to generate a Very High Throughput Signal B (VHT-SIG-B) field including control information and a tail field;
a data field generation unit configured to:
generate a data field including a service field and a physical layer convergence protocol physical service data unit (PSDU), the service field including scrambling information and a cyclic redundancy check (CRC), the CRC being calculated over the control information,
generate a scrambling sequence which is initialized based on the scrambling information; and
generate a scrambled data field by scrambling the service field with the scrambling sequence;
a frame generation unit configured to generate a frame including the scrambled data field and the VHT-SIG-B field; and
a transmitting unit configured to transmit the frame over an operating channel.

19. The apparatus of claim 18, wherein the VHT-SIG-B field includes a block of bits, wherein a bit number of the block of bits is determined based on a channel bandwidth of the operating channel.

20. The apparatus of claim 19, wherein the bit number of the block of bits is 26 bits if the channel bandwidth is 20 MHz.

21. The apparatus of claim 19, wherein the bit number of the block of bits is 27 bits if the channel bandwidth is 40 MHz.

22. The apparatus of claim 19, wherein the bit number of the block of bits is 29 bits if the channel bandwidth is larger than 40 MHz.

23. The apparatus of claim 19, wherein the block of bits is repeated a predetermined number of times in accordance with the channel bandwidth of the operating channel.

24. The apparatus of claim 18, wherein the number of bits for the scrambling information is 7, the number of bits for the CRC is 8, and the number of bits for the tail field is 6.

25. An apparatus for a wireless local area network, the apparatus comprising:
a receiving unit configured to receive a frame including a Very High Throughput Signal B (VHT-SIG-B) field and a scrambled data field, the VHT-SIG-B field including control information and a tail field, the scrambled data field including a service field and a physical layer convergence protocol physical service data unit (PSDU), the service field including scrambling information and a cyclic redundancy check (CRC);
a decoding unit configured to:
decode the frame to output the VHT-SIG-B field and the scrambled data field,
descramble the scrambled data field with a scrambling sequence which is initialized based on the scrambling information, and
detect a transmission error by comparing the CRC with a CRC calculated based on the control information.

26. The apparatus of claim 25, wherein the VHT-SIG-B field includes a block of bits, wherein a bit number of the block of bits is determined based on a channel bandwidth of the operating channel.

27. The apparatus of claim 26, wherein the bit number of the block of bits is 26 bits if the channel bandwidth is 20 MHz.

28. The apparatus of claim 26, wherein the bit number of the block of bits is 27 bits if the channel bandwidth is 40 MHz.

29. The apparatus of claim 26, wherein the bit number of the block of bits is 29 bits if the channel bandwidth is larger than 40 MHz.

30. The apparatus of claim 25, wherein the number of bits for the scrambling information is 7, the number of bits for the CRC is 8, and the number of bits for the tail field is 6.

* * * * *